United States Patent [19]

Nojiri et al.

[11] Patent Number: 4,971,176
[45] Date of Patent: Nov. 20, 1990

[54] DATA GATHERING SYSTEM INCLUDING CRADLE SUSPENSION

[75] Inventors: Howard H. Nojiri, Eugene, Oreg.; Nigel G. Mills, Worthington; James F. Million, Powell, both of Ohio

[73] Assignee: Spectra-Physics, Inc., San Jose, Calif.

[21] Appl. No.: 328,178

[22] Filed: Mar. 24, 1989

[51] Int. Cl.$^5$ .................. A47F 9/04; G01G 21/28; G06K 7/10
[52] U.S. Cl. .................................. 186/061; 177/245; 235/383
[58] Field of Search .................. 186/61; 235/383, 462; 364/405, 567; 177/1, 50, 245

[56] References Cited

U.S. PATENT DOCUMENTS

| | | | |
|---|---|---|---|
| 4,656,344 | 4/1987 | Mergenthaler | 235/462 |
| 4,700,656 | 10/1987 | Cone et al. | 235/462 X |
| 4,879,650 | 11/1989 | Kurimoto et al. | 364/405 |
| 4,881,606 | 11/1989 | Halfon et al. | 177/245 X |

Primary Examiner—F. J. Bartuska
Attorney, Agent, or Firm—Killworth, Gottman, Hagan & Schaeff

[57] ABSTRACT

A two part data gathering system for use in a checkout counter to determine information relating to products to be purchased comprises a scale freely suspended within the checkout counter for determining weights of products, the scale including a scale load receiving plate located below the upper surface of the counter. An optical scanner is supported upon the scale load receiving plate for reading coded labels on the products. The optical scanner has an upper surface including an optical scanning window through which scanning light beams pass and is vertically positioned such that its upper surface is substantially aligned with the upper surface of the checkout counter when the optical scanner is supported upon the scale load receiving plate. The weight of the optical scanner is eliminated from the weight readings provided by the scale and the upper surface of the optical scanner becomes the scale weighing platter for receiving products to be weighed by the scale. The data gathering system is freely suspended by a hanging cradle support to ease and facilitate installation and removal of the system.

15 Claims, 5 Drawing Sheets

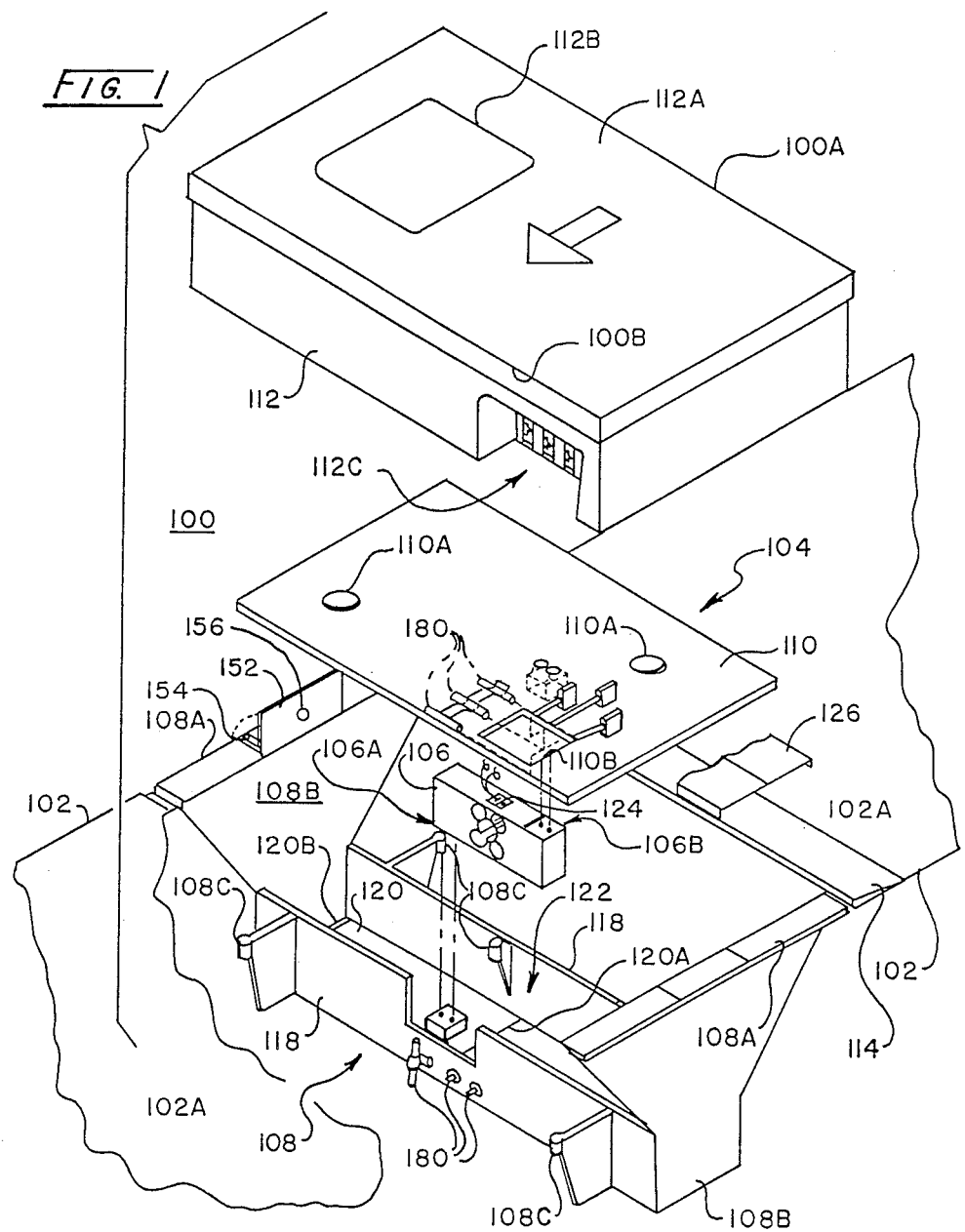

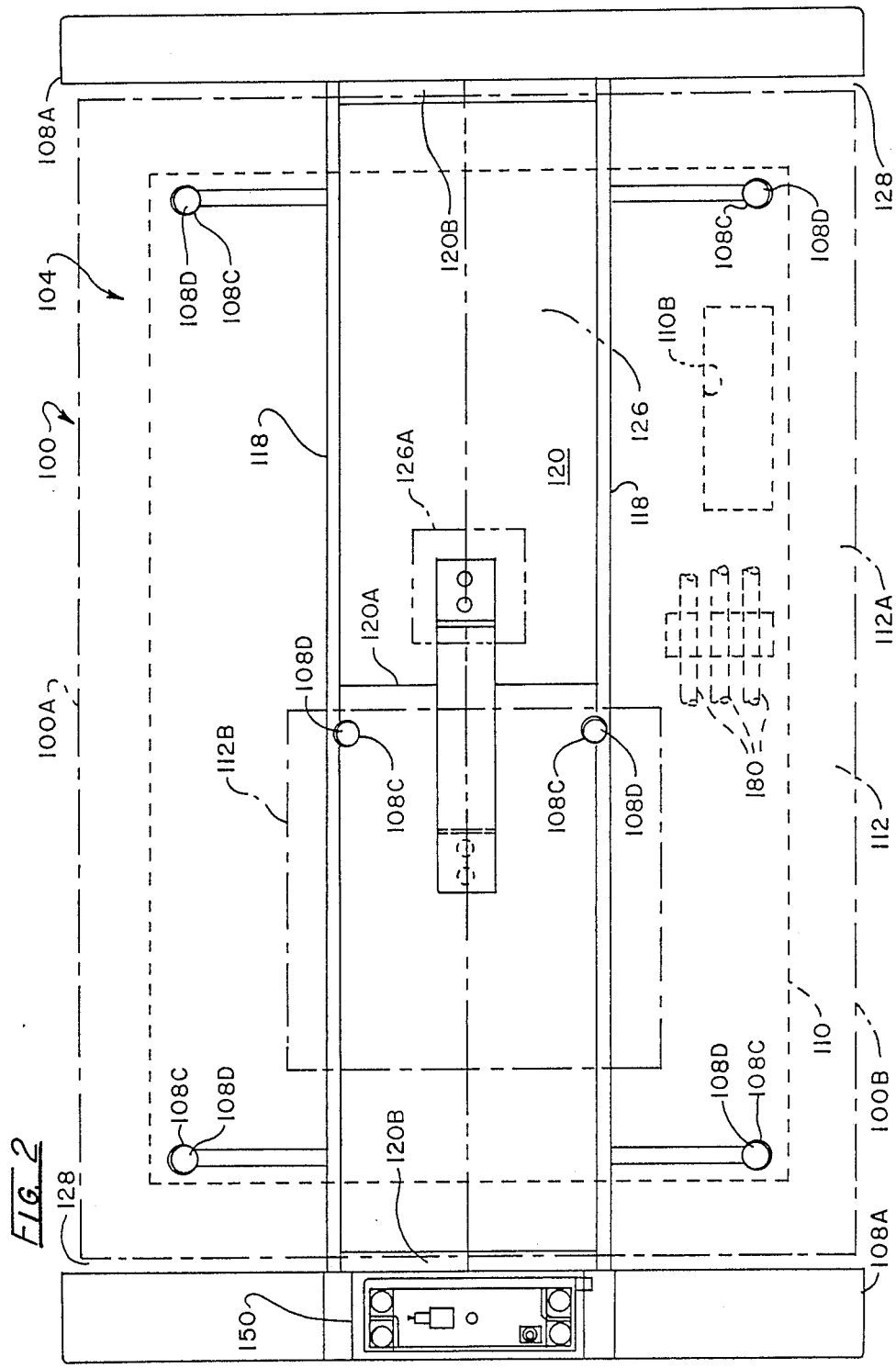

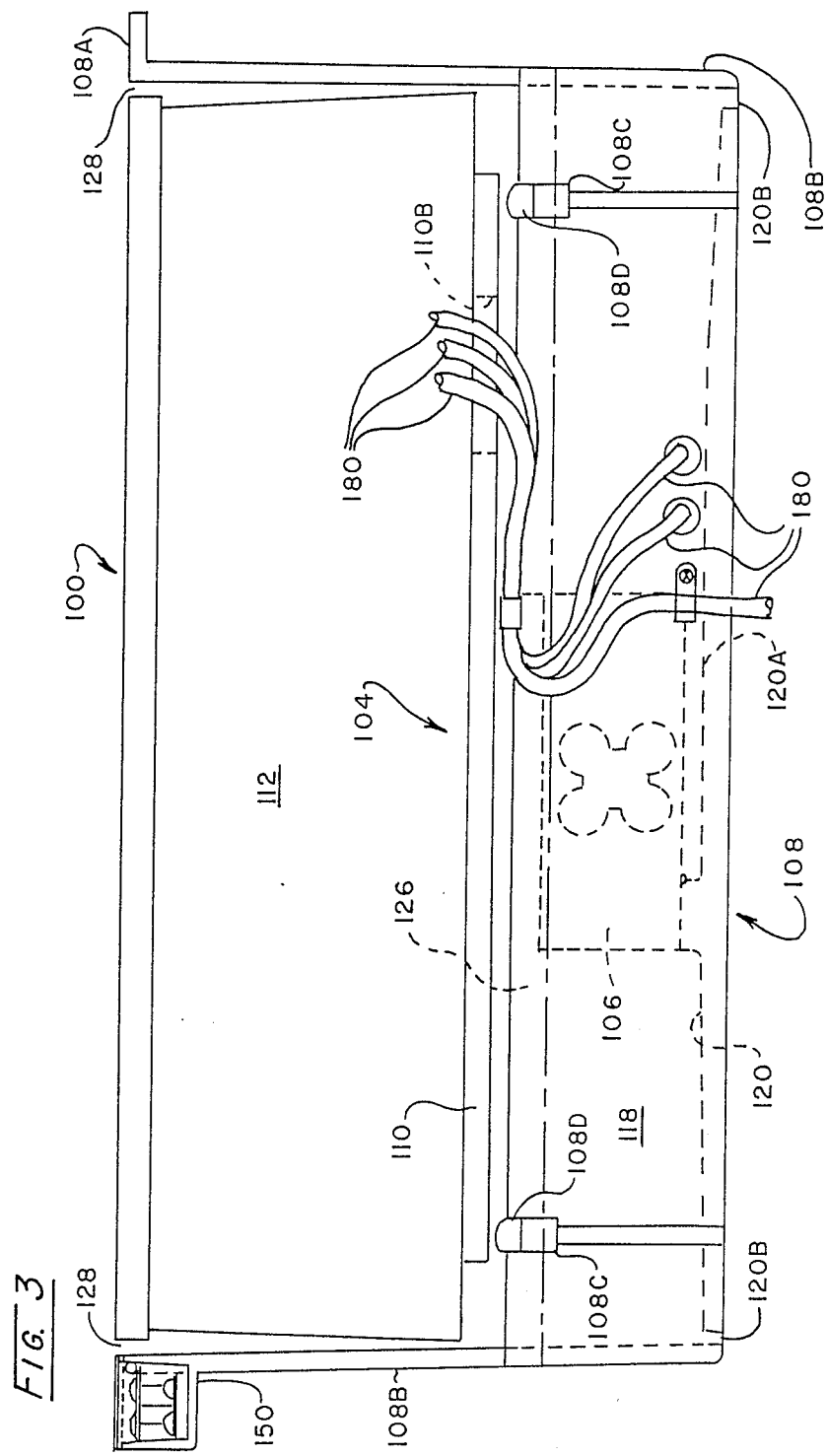

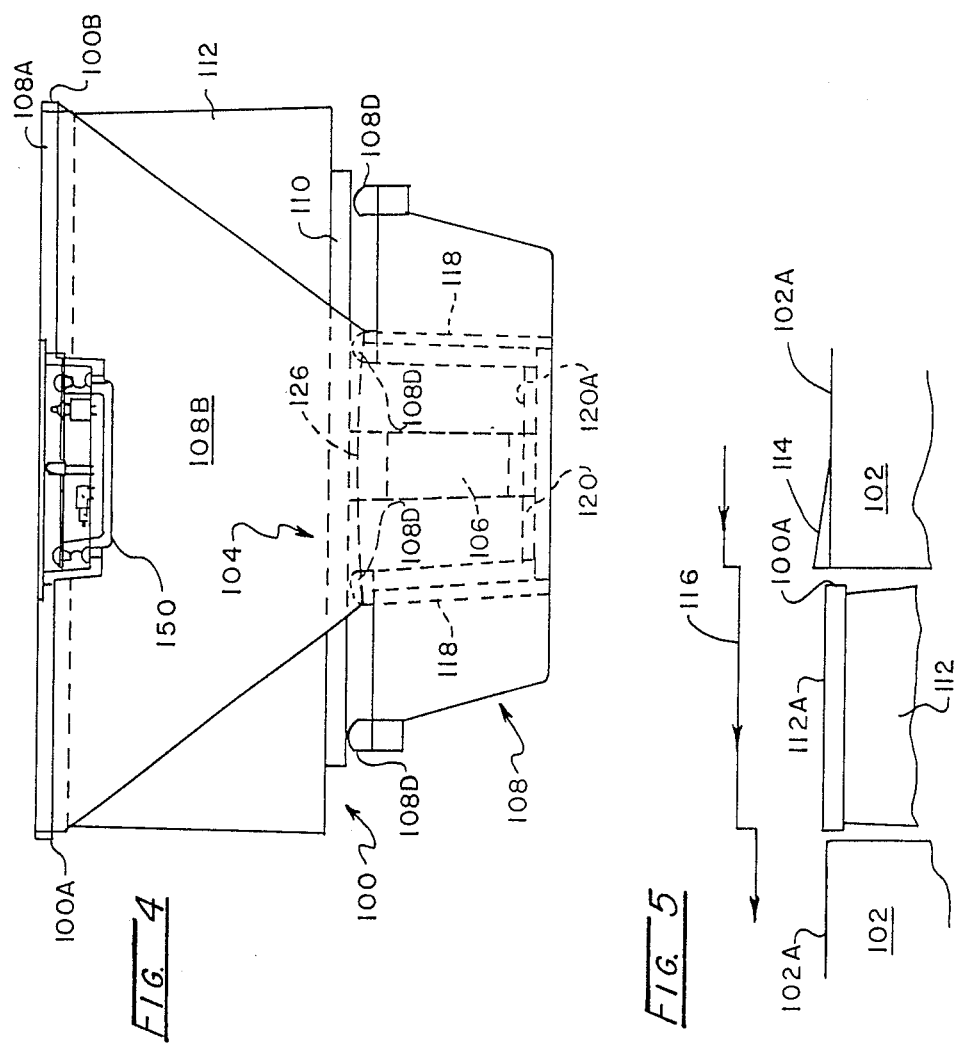

DATA GATHERING SYSTEM INCLUDING CRADLE SUSPENSION

CROSS REFERENCE TO RELATED APPLICATIONS

The Present aPPlication is related to the following U.S. Pat. applications which were filed on even date herewith: Method and Apparatus for Mounting Data Gathering System, Ser. No. 328,229. Spill Control Mounting for Data Gathering System Ser. No. 328,230: Scale Calibration/Zeroing in Data Gathering System Ser. No. 328,188; Data Gathering System Housing/Mounting Ser. No. 328,461: and, Point-of-Sale Data Gathering System, Ser. No. 328,272.

BACKGROUND OF THE INVENTION

The present invention relates generally to data gathering systems for use at point of sale checkout counters and, more particularly, to a data gathering system which comprises an optical scanner rested upon a weighing scale and support means for suspending the data gathering system within a counter such that the optical scanner provides a weighing platter for the scale at an upper surface of the counter. Thus, bar coded data imprinted upon labels applied to products presented at the counter can be read by the optical scanner and the weight of such products can also be determined by placing the products on the optical scanner.

Supermarket checkout counters commonly include optical scanners mounted therein for optically scanning bar code labels on products to be purchased as the products are moved over scanning windows in the top surfaces of the scanners. The scanners read and convert the bar code labels into product identification and pricing information which is used for the sale and other merchandising purposes, such as inventory control. Since many products sold in supermarkets, for example produce, are sold by weight, oftentimes weighing scales are also positioned adjacent the checkout counters. The weighing scales can be manually operable such that sales clerks weigh products and then enter the resulting prices on associated registers. Alternately, the weighing scales can be partially or fully automated such that the weights and corresponding price information are directly passed to the registers.

One example of an automated data gathering system is disclosed in U.S. Pat. No. 4,656,344, wherein a scale and an optical scanner are not only directly interconnected to an associated register but also are integrated into a single unit which fits within the checkout counter. While this integrated scale/scanner system offers advantages over the prior separated component systems in terms of convenience and space savings, still there are disadvantages and inconveniences associated with the integrated system. For example, by making the scale and scanner a single integrated unit, the system is heavy and difficult to install and/or remove from a receiving checkout counter. While access panels can be provided in the checkout counter, if they are not, this problem is aggravated since the system otherwise must be removed from the checkout counter each time the scale is to be repaired or calibrated and then the system must be reinstalled.

Accordingly, there is a need for a data gathering system for use at a point of sale checkout counter which provides for both scanning coded labels and also weighing products which are to be sold by weight yet does so in a compact packaging arrangement which includes system support means for reliably suspending the system within the checkout counter and simplifying removal and installation of the system for maintenance and repair.

SUMMARY OF THE INVENTION

This need is met by a data gathering system in accordance with the present invention for use in a point of sale checkout counter wherein a scale is secured to a support cradle for freely suspending the scale within the checkout counter at a point below an upper surface of the counter. An optical scanner is rested upon and becomes the weighing platter of the scale at a point substantially aligned with the upper surface of the counter. The weight indication due to the optical scanner and associated cabling supported by the scale is eliminated during calibration so that the scale reading indicates only the weight of products placed upon the optical scanner. In this way a combined scale/scanner system which reads bar coded data imprinted upon labels applied to products and also determines the weights of products which are placed on the optical scanner, i.e. the weighing platter of the scale, is suspended within the checkout counter for ease of removal and installation of the system.

In accordance with one aspect of the present invention, a data gathering system is provided for determining information relating to products to be purchased which products are placed upon an upper surface of a checkout counter. The checkout counter provides easy access to the data gathering system which comprises scale means including a scale load receiving plate for determining weights of products presented to the data gathering system. The scale means is secured to support means which provide for freely suspending the data gathering system within the checkout counter to facilitate installation and removal of the system. Optical scanning means for reading coded labels on the products is rested upon the scale load receiving plate. The optical scanning means has an upper surface including an optical scanning window through which scanning light beams pass and is vertically positioned such that its upper surface is substantially aligned with the upper surface of the checkout counter when the optical scanner is rested upon the load receiving plate. The weight indication due to the optical scanning means is eliminated during calibration from the weight readings of the scale means and the upper surface of the optical scanning means becomes the scale weighing platter for receiving products to be weighed by the scale.

The support means may comprise a support cradle adapted to be hung from the checkout counter with the support cradle defining at least two scale load receiving plate stop members positioned to limit deflection of the plate to thereby prevent potentially damaging overload of the scale. The support cradle defines a selected size opening for receiving the optical scanner generally centered therein such that defined air gaps are maintained between the support cradle and the scanner.

The scale means may comprise a load cell connected between the support cradle and the load receiving plate. The support cradle preferably defines a channel extending laterally across the checkout counter for receiving and protecting the load cell. The data gathering system may further comprise cables connected to the optical scanning means for conducting electrical signals and power, which cables are sized, positioned and secured to the scale load receiving plate and the channel to prevent interference with the operation of the scale. In this way, the cables do not affect movement of the load cell even though the cables pass through or by the scale load receiving plate and are connected into the optical scanning means resting thereon.

In accordance with another aspect of the present invention, a data gathering system is provided for determining information relating to products to be purchased which products are placed upon an upper surface of a checkout counter. The checkout counter provides easy access to the data gathering system which comprises support means for freely suspending the data gathering system within the checkout counter and scale means secured to the support means for determining weights of products presented to the data gathering system. The scale means includes a scale load receiving plate located below the upper surface of the checkout counter. Optical scanning means for reading coded labels on the products is rested upon the scale load receiving plate. The optical scanning means has an upper surface including an optical scanning window through which scanning light beams pass and is vertically positioned such that its upper surface is substantially aligned with the upper surface of the checkout counter when the optical scanning means is rested upon the scale load receiving plate. The weight of the optical scanning means is treated as a tare weight for the scale means such that the upper surface of the optical scanning means serves as a scale weighing platter for receiving products to be weighed by the scale.

In accordance with yet another aspect of the present invention, a method of installing a data gathering system to determine information relating to products to be purchased at a checkout counter comprises the steps of suspending a weighing scale within the checkout counter, supporting an optical scanner upon the weighing scale, eliminating the weight of the scanner from weighing results utilized by the system, and utilizing the scanner to read coded labels on products and as a weighing platter to receive products to be weighed by the scale. The method may further comprise the step of suspending the data gathering system within the checkout counter at a vertical position such that the upper surface of the scanner is at a desired position with respect to the upper surface of the checkout counter to receive products to be weighed and to read the coded labels. Preferably, the method further comprises the steps of connecting electrical cables to the weighing scale, and compensating for the weight and spring effect of the electrical cables and supporting the scanner upon the weighing scale to resist relative horizontal movement of the scanner with respect to the scale.

It is thus an object of the present invention to provide a data gathering system for installation in a checkout counter which system both reads bar-coded labels and determines the weights of products placed on an upper surface of the system which is structured as a scale having an optical scanner rested thereon with the system being freely suspended within the counter by a support cradle to ease and facilitate removal and installation of the system for maintenance and repair.

Other objects and advantages of the invention will be apparent from the following description, the accompanying drawings and the appended claims.

BRIEF DESCRIPTION OF THE DRAWINGS

FIG. 1 is an exploded perspective view of a data gathering system in accordance with the present invention for use in a checkout counter;

FIGS. 2-4 are top, side and end views, respectively, of the data gathering system of FIG. 1;

FIG. 5 is a schematic side view of the upper surface of a checkout counter including the data gathering system of the present invention and showing a trim strip for defining a preferred product flow path; and, FIGS. 6-8 illustrate a preferred calibration and zeroing arrangement for the scale of the data gathering system.

DETAILED DESCRIPTION OF THE INVENTION

Figure 6:
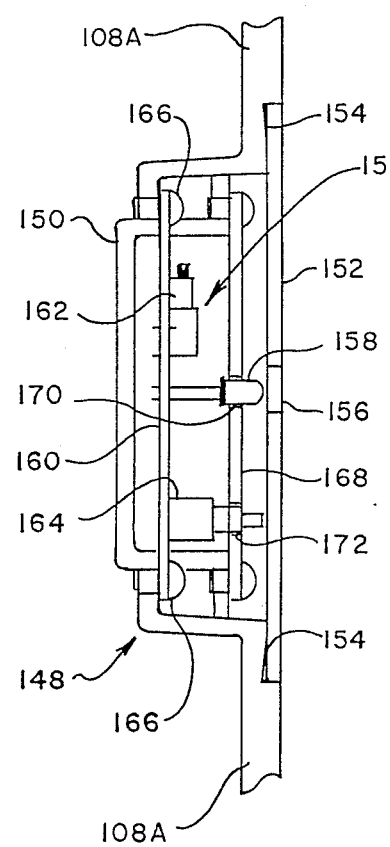

Reference is now made to the drawings which show a data gathering system 100 in accordance with the present invention which is designed for use in a point of sale checkout counter 102. The data gathering system 100 is designed to be fitted entirely within the counter 102 and is structured as two separate units which can be independently manufactured, tested, packaged and shipped and also individually handled and installed. By structuring the system as two separate units, it initially can be easily installed in the counter 102 and thereafter easily removed and reinstalled for system maintenance and repair. Further, the scanning operation can be more easily and accurately performed since scanning light beams pass directly from the scanner as opposed to passage through secondary windows and/or apertures as in prior art systems wherein a scale platter is required above the top of the scanner. The data gathering system 100 conveniently provides for both reading bar-coded labels secured to products to be purchased and also weighing products which are placed upon the upper surface of the system.

The data gathering system 100 comprises scale means, taking the form of a load cell scale 104 in the illustrated embodiment, which is supported within the checkout counter 102 by support means and provides for determining weights of products presented to the data gathering system 100. The scale 104 comprises a cantilever beam load cell 106 secured at one end 106A to the support means which comprises a support cradle 108 in the preferred embodiment, and to a scale load receiving plate or subplatter 110 at its opposite end 106B. The subplatter 110 is located below the upper surface 102A of the checkout counter 102 as best shown in FIGS. 3 and 4.

Optical scanning means comprising a self-contained optical scanner 112 is rested upon the scale subplatter 110 for reading coded labels, such as bar-coded labels, on products presented for purchase at the checkout counter 102. The optical scanner 112 has an upper surface 112A including an optical scanning window 112B through which scanning light beams pass. The optical scanning window 112B is flush with the remainder of the upper surface 112A such that the window 112B and upper surface 112A are easy to clean. The remainder of the upper surface 112A defines a weighing area adjacent to the window 112B which receives the majority of items to be weighed such that debris from those items will not fall on the window 112B tending to keep it clean.

The optical scanner 112 is sized and vertically positioned such that its upper surface 112A is substantially aligned with the upper surface 102A of the checkout counter 102 when the optical scanner 112 is rested upon the scale subplatter 110. The weight of the optical scanner 112 and associated cabling is, like that of the subplatter 110, zeroed out in establishing the scale zero reading during calibration or treated as a tare weight for the scale 104. Thus, the upper surface 112A of the optical scanner 112 serves as the scale weighing platter for receiving products to be weighed and only the product weights are included in the weight readings.

The scale subplatter 110 and scanner 112 include scanner locator means comprising two raised circular bosses 110A on the subplatter 110 which are received by corresponding indentations (not shown) formed into the bottom of the optical scanner 112 in the illustrated embodiment. The scanner locator means provide for positioning and horizontally stabilizing the optical scanner 112 on the scale subplatter 110 for assembly and operation of the data gathering system 100. Alternately, bosses or pins could be formed on the scanner 112 with matching indentations or holes on the subplatter 110, or combinations of bosses and matching indentations could be formed on both the scanner 112 and the subplatter 110. Of course, differently shaped bosses or different locating means can be provided as will be apparent to those skilled in the art.

The data gathering system 100 may be positioned within the checkout counter 102 such that the upper surface 112A of the optical scanner 112 is slightly above the upper surface 102A of the counter 102 as best shown in FIGS. 1 and 5. This positioning of the data gathering system 100 within the counter 102 combined with a tapered trim strip 114 defines a downwardly stepped path illustrated by the arrow 116 shown in FIG. 5 for products to be processed by the system. The tapered trim strip 114 is secured across the checkout counter 102 adjacent the entry side 100A of the data gathering system 100 to slightly elevate the upper surface 102A of the counter 102 above the upper surface 112A of the system.

The trim strip 114 is shown as having exaggerated thickness in FIG. 5; however, it can be quite thin, as thin as 0.040–0.080 inch depending upon the stiffness of the scale 104, and yet provide smooth passage of products across the data gathering system 100. The downwardly stepped path for products processed by the system is important since the smooth upper surface 112A of the scanner 112 permits products to be slid thereacross by a sales clerk using the data gathering system 100. If a downwardly stepped path is not provided, products may catch at the entry side 100A and potentially at the exit side 100B of the system inconveniencing the sales clerk and substantially reducing this attractive feature of the system.

The support means or support cradle 108 is adapted to be hung from the checkout counter 102 by means of support flanges 108A which extend from end plates 108B of the support cradle 108 to freely suspend the system 100 within the counter 102. The end plates 108B are separated from one another by a distance which is preferably substantially equal to the length of the scanner 112 plus ¼ inch such that with the scanner 112 centered therebetween, a ⅛ inch air gap is maintained at each end of the scanner. Similar sizing/spacing is defined at the entry and exit sides 100A, 100B of the system, see FIGS. 2 and 3.

Such spacing is important since the upper surface of the system defining the scale weighing platter must be free to deflect vertically without contact with the counter to ensure accurate weights. In the prior art, problems have been encountered due to irregularities or insufficient length or width of the counter openings which can result in improper installation and weights. Problems can also be created in the prior art due to lateral movement of the scale caused by placing or sliding products over the scale platter. Such problems are substantially eliminated by the present system. It should be apparent that the counter 102 can be adapted to support the data gathering system 100 from the support flanges 108A such that the system can be precisely located relative to the counter 102 with convenient adjustment, if necessary, being provided by shims or otherwise. The data gathering system 100 may be maintained in position by interengagement of the support flanges 108A with the counter 102 or a variety of fastener devices can be employed if desired as will be apparent to those skilled in the art.

The support cradle 108 comprises at least two scale subplatter stop members 108C, six stop members 108C being included in the illustrated embodiment as best shown in FIGS. 1 and 2, positioned to engage the subplatter 110 at the maximum allowable extent of its travel to thereby prevent potentially damaging overloading of the load cell 106. Preferably, stop pads 108D made of hardened tool steel are formed at the upper surfaces of the stop members 108C as shown in FIGS. 2-4.

The support cradle 108 comprises generally vertical side walls 118 and a bottom wall 120 which define a channel 122 extending laterally across the checkout counter 102 for receiving and protecting the load cell 106 and electrical circuitry (not shown) which is connected to and operable with one or more force transducers, such as gauges 124, see FIG. 1, of the load cell 106 in accordance with well known weighing scale technology. The bottom wall 120 is peaked near its center 120A such that it gradually tapers downwardly toward the end plates 108B of the support cradle 108 adjacent which the bottom wall 120 terminates in open slots 120B. A crowned channel cover 126, shown in FIGS. 1-4, includes an opening 126A through which the load cell 106 is connected to the scale subplatter 110, see FIG. 2.

This support arrangement or mounting for the data gathering system 100 is preferred since it provides improved spill control over the prior art. In particular, any spilled liquids which flow over the entry side 100A or exit side 100B of the system will flow harmlessly down the sides of the optical scanner 112 to the floor beneath the system where it can be periodically or immediately attended to through access panels (not shown) in the counter 102. Spilled liquids which flow down the ends of the system are limited to some extent by the narrow slots 128 between the optical scanner 112 and the support flanges 108A/end plates 108B of the support cradle 108, see FIGS. 2 and 3. Further, the majority of such liquid will also flow harmlessly to the floor beneath the system due to the narrowness of the width of the channel 122 which is approximately one third of the width of the data gathering system 100. The remaining small portion of spilled liquid which passes through the narrow slots 128 will initially engage the crowned channel cover 126 and be diverted to the sides of the channel 122 and once again to the floor beneath the system.

Any spilled liquid which does manage to seep past the channel cover 126 will flow down the interior surfaces of the end plates 108B and/or be diverted by the tapered bottom wall 120 to pass to the floor beneath the system through the slots 120B. Spilled liquids are thus eliminated from the data gathering system 100 by paths which do not tend to interfere with the movement and hence the operation of the scale 104 of the system. While liquids, particularly thick liquids, may tend to accumulate on the optical scanner walls and change the zero setting of the scale 104, this creates no problem since the scale 104 can be conveniently calibrated and/or automatically or manually zeroed without removal of the system 100 from the counter 102 as will now be described.

Figure 7:
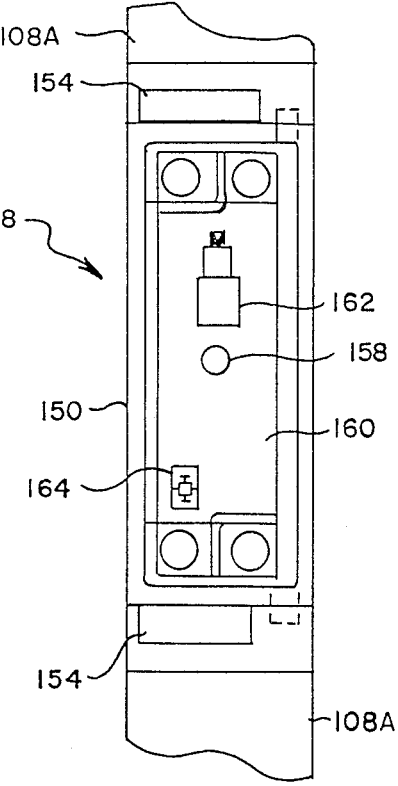
Figure 8:
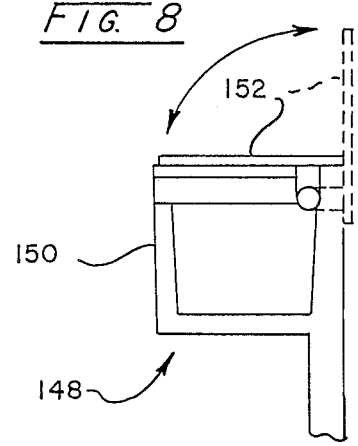

The data gathering system 100 includes scale adjusting means comprising a scale calibrating/zeroing system 148 which is integrated into one of the support flanges 108A. The calibrating/zeroing system 148 is enclosed in a housing 150 as generally shown in FIGS. 1-4 and best shown in FIGS. 6-8 wherein various elements of the system are not shown in all the drawing figures for ease of description and illustration. The housing 150 is covered by a hingedly mounted door 152 formed of a ferromagnetic material and maintained in its closed position by magnets 154 embedded within the support flange 108A and includes a window 156 through which a light source such as a light emitting diode (LED) 158 visibly signals a sales clerk using the data gathering system 100 or other personnel servicing the system. Other housing closures such as snap fitting latches and the like will be apparent to those skilled in the art for use in the present invention.

Mounted within a chamber 150A, see FIG. 6, of the housing 150 is a circuit board 160 to which is mounted a scale calibration switch 162, the LED 158 and a scale zeroing switch 164. The circuit board 160 is secured within the chamber 150A of the housing 150 by screws 166 or other appropriate fastening devices. A cover panel 168, see FIG. 6, is secured and preferably sealed in the upper part of the housing 150 to form an upper wall of the chamber 150A. The cover panel 168 includes apertures 170 and 172 through which the LED 158 and the zeroing switch 164 protrude, respectively. A lighted switch could be used, if desired, to replace the LED 158 and the zeroing switch 164 for a potentially simplified user interface. In any event, the panel 168 thus permits access to the zeroing switch 164 if the door 152 is opened by a sales clerk or other authorized person to permit convenient zeroing or rezeroing of the scale 104; however, the panel 168 prevents access to the calibration switch 162 Which should only be operated by service personnel on a periodic basis. After calibration, the panel 168 would be sealed in accordance with requirements of local weights and measures.

In accordance with the calibrating/zeroing system 148 of the data gathering system 100, if the scale 104 indicates a weight other than zero when nothing is present on the upper surface 112A of the optical scanner 112 the operator can zero the scale 104 by activating the scale zeroing switch 164 after opening the door 152. Zero drifts may be caused, for example, by the accumulation of debris on the extended optical-scanner/weighing-platter combination. Also, to ensure accurate weighing operations, the scale 104 is periodically calibrated or recalibrated by authorized service personnel. However, in this system, as opposed to the prior art, the service person merely has to open the door 152, remove the weights and measures seal and the cover panel 168, and depress the calibration switch 162 to initiate the calibration operation.

Accordingly, the data gathering system 100 does not have to be removed from the counter 102 for such standard maintenance operations. The LED 158 is used to signal the operator that service is required and to assist in performing the service which is required. For example, the LED 158 may be lighted to advise the operator that the scale 104 is zeroed and extinguished if the scale 104 drifts out of zero. For calibration, the lighting of the LED 158 can be controlled to advise the service person that steps of a calibration operation have been properly performed.

As an example of a calibration routine for a scale having a 30 pound (15 kg) capacity, a precision weight of 20 pounds (10 kg) and zero weight may be used. Initially, the calibration switch 162 is depressed to start the calibration routine. The LED 158 will begin to blink indicating the calibrate mode. A service person ensures that no weight is present on the optical-scanner/weight-platter and then depresses the zeroing switch 164. Once this step is successfully completed, the LED 158 is lighted for aproximately 5 seconds and then begins blinking again to signal the service person to place the 20 pound (10 kg) weight on the center of the optical-scanner/weighing-platter and press the zeroing switch 164. The LED 158 will then extinguish for approximately 5 seconds and then light steadily when calibration is completed. From these two known data points, the scale 104 can generate accurate weight signals for products placed on the upper surface 112A of the optical scanner 112. Of course, alternate calibration and zeroing techniques can be used in the calibrating/zeroing system disclosed.

To prevent interference with operation of the scale 104, cables for conducting electrical signals and power between the optical scanner 112 and the scale 104 of the data gathering system 100 are formed and secured to the scale 104 during its manufacture. More particularly, cables 180 are sized such that they extend betWeen and are secured to the scale subplatter 110 and one of the side walls 118 of the channel 122 such that the cables 180 permit free deflection of the load cell 106 but do not affect such deflection, see FIGS. 1-3. By securing the cables 180 to subplatter 110 and one of the side walls 118, the cables 180 define a spring having a constant spring rate so that the weight and spring rate of the cables 180 can be compensated during calibration of the scale 104. This cabling arrangement is important since cables to the optical scanner 112 must be routed through the scale subplatter 110 via an opening 110B therethrough. The cables 180 include sufficient slack to permit quick and easy installation and removal of the scanner 112. The cables 180 are then routed up to a vestibule 112C on the scanner 112 and connected to the appropriate connectors therein. The cables 180 include sufficient slack between the subplatter 110 and the scanner 112 to permit quick and easy installation and removal of the scanner 112.

Having thus described the data gathering system of the present invention in detail and by reference to preferred embodiments thereof, it will be apparent that modifications and variations are possible without departing from the scope of the invention defined in the appended claims.

What is claimed is:

1. A data gathering system for use in a checkout counter to determine information relating to products to be purchased, said counter defining an upper surface upon which products are placed for access to said data gathering system which comprises:

scale means for determining weights of products presented to said data gathering system, said scale means including a scale load receiving plate;

support means comprising a support cradle adapted to be hung from said counter for freely suspending said scale means within said counter such that said load receiving plate is located below the upper surface of said checkout counter, said scale means being secured to said support cradle; and optical scanning means rested upon said load receiving plate for reading coded labels on said products, said optical scanning means having an upper surface including an optical scanning window through which scanning light beams pass and being vertically positioned by said support cradle such that the upper surface of said optical scanning means is substantially aligned with the upper surface of said checkout counter when rested upon said load receiving plate, said support cradle defines a selected size opening for receiving said scanning means generally centered therein such that defined air gaps are maintained between said support cradle and said scanning means, the weight indication due to said optical scanning means being eliminated during calibration from the weight readings of said scale means and the upper surface of said optical scanning means becoming a scale weighing platter for receiving products to be weighed by said scale means.

2. A data gathering system for use in a checkout counter as claimed in claim 1 wherein said support cradle comprises at least two stop members positioned to engage said load receiving plate to thereby prevent overload of said scale means.

3. A data gathering system for use in a checkout counter as claimed in claim 1 wherein said scale means comprises a load cell connected between said support cradle and said load receiving plate.

4. A data gathering system for use in a checkout counter as claimed in claim 3 wherein said support cradle defines a channel extending laterally across said checkout counter for receiving and protecting said load cell.

5. A data gathering system for use in a checkout counter as claimed in claim 4 further comprising cables connected between said scale means and said optical scanning means for conducting electrical signals and power, said cables being sized, positioned and secured to said load receiving plate and said channel to prevent interference with the operation of said scale means.

6. A data gathering system for use in a checkout counter to determine information relating to products to be purchased, said counter defining an upper surface upon which products are placed for access to said data gathering system which comprises:

support means comprising a support cradle adapted to be hung from said counter for freely suspending said data gathering system within said counter;

scale means secured to said support means for determining weights of products presented to said data gathering system, said scale means including a load receiving plate located below the upper surface of said checkout counter; and optical scanning means rested upon said load receiving plate for reading coded labels on said products, said optical scanning means being sized relative to said support cradle such that defined air gaps are maintained between said support cradle and said optical scanning means which has an upper surface including an optical scanning window through which scanning light beams pass and being vertically positioned such that its upper surface is substantially aligned with the upper surface of said counter when rested upon said load receiving plate, the weight of said optical scanning means being treated as a tare weight for said scale means such that the upper surface of said optical scanning means becomes a scale weighing platter for receiving products to be weighed by said scale means.

7. A data gathering system for use in a checkout counter as claimed in 6 wherein said support cradle comprises at least two stop members positioned to engage said load receiving plate to thereby prevent overload of said scale means.

8. A data gathering system for use in a checkout counter as claimed in claim 6 wherein said scale means comprises a load cell connected between said support cradle and said load receiving plate.

9. A data gathering system for use in a checkout counter as claimed in claim 8 wherein said support cradle defines a channel extending laterally across said checkout counter for receiving and protecting said load cell.

10. A data gathering system for use in a checkout counter as claimed in claim 9 further comprising cables connected between said scale means and said optical scanning means for conducting electrical signals and power, said cables being sized, positioned and secured to said load receiving plate and said channel to prevent interference with the operation of said scale means.

11. A method of installing a data gathering system to determine information relating to products to be purchased at a checkout counter, comprising the steps of suspending a weighing scale having a scale load receiving plate within said counter by means of a support cradle adapted to be hung therefrom, supporting an optical scanner upon the load receiving plate of said weighing scale for reading coded labels on said products, eliminating the weight of said scanner from weighing results utilized by the system, sizing said support cradle relative to said optical scanner such that defined air gaps are maintained between said support cradle and said optical scanners to ensure free movement of said optical scanner within said support cradle and hence proper operation of said weighing scale, and utilizing said optical scanner to read coded labels on said products and as a weighing platter to receive products to be weighed by the scale.

12. A method of installing a data gathering system as claimed in claim 11 further comprising the step of suspending the data gathering system within said checkout counter at a vertical position such that the upper surface of said scanner is at a desired position with respect to the upper surface of said checkout counter to receive products to be weighed and to read the coded labels.

13. A method of installing a data gathering system as claimed in claim 12 further comprising the steps of connecting electrical cables to said weighing scale, and compensating for the weight and spring effect of said electrical cables.

14. A method of installing a data gathering system as claimed in claim 13 further comprising the step of supporting said scanner upon said weighing scale to resist relative horizontal movement of said scanner with respect to said scale.

15. A method of installing a data gathering system as claimed in claim 14 further comprising the step of forming said support cradle to define a channel extending laterally across said counter for receiving and protecting said weighing scale.

* * * * *